United States Patent [19]

Fujimoto

[11] Patent Number: 5,735,441
[45] Date of Patent: Apr. 7, 1998

[54] APPARATUS FOR ATTACHING TWO-WHEELED VEHICLE PARTS ALLOWING ADJUSTMENT OF THE ATTACHMENT ANGLE

[75] Inventor: Takuya Fujimoto, Osaka, Japan

[73] Assignee: Cateye Co., Ltd., Osaka, Japan

[21] Appl. No.: 541,257

[22] Filed: Oct. 12, 1995

[30] Foreign Application Priority Data

Oct. 17, 1994 [JP] Japan .................................. 6-250893

[51] Int. Cl.[6] .................................................. B62J 6/00
[52] U.S. Cl. .................................... 224/420; 224/553
[58] Field of Search ............................ 224/420, 443, 224/547, 553

[56] References Cited

U.S. PATENT DOCUMENTS

| | | | |
|---|---|---|---|
| 3,643,902 | 2/1972 | Gualano | 224/553 X |
| 4,974,759 | 12/1990 | McDonough | 224/443 |
| 5,040,710 | 8/1991 | Lee | 224/420 X |
| 5,040,712 | 8/1991 | Pesonen et al. | 224/553 X |

FOREIGN PATENT DOCUMENTS

| | | |
|---|---|---|
| 499 870 | 8/1992 | European Pat. Off. . |
| 498 358 | 12/1992 | European Pat. Off. . |
| 2145810 | 3/1985 | United Kingdom . |

OTHER PUBLICATIONS

English version of the Search Report from the EPO dated May 7, 1996.

Office Action of the Taiwanese Patent Office and English Translation for the corresponding patent application filed in Taiwan dated Oct. 17, 1996.

*Primary Examiner*—Renee S. Luebke
*Attorney, Agent, or Firm*—Olson & Hierl, Ltd.

[57] ABSTRACT

An apparatus for attaching a two-wheeled vehicle part includes an attachment part attached to a component of a two-wheeled vehicle, an attachment part fixed on a two-wheeled vehicle part, and an attachment part connecting the first and second attachment parts. Attachment parts rotate relative to each other, with a threaded hole serving as an axis, in a range where a convex portion engages with a projecting portion. By bringing attachment parts into pressure contact by means of a screw, the rotation is stopped. Meanwhile, attachment parts are detachable from each other by sliding of rail members with grooves. A stopper controls attachment/detachment of attachment parts.

8 Claims, 12 Drawing Sheets

5,735,441

APPARATUS FOR ATTACHING TWO-WHEELED VEHICLE PARTS ALLOWING ADJUSTMENT OF THE ATTACHMENT ANGLE

BACKGROUND OF THE INVENTION

1. Field of the Invention

The present invention relates to an apparatus for attaching two-wheeled vehicle parts and, more specifically to an attachment apparatus used for attaching a two-wheeled vehicle part, such as a head lamp, to a two-wheeled vehicle.

2. Description of the Background Art

FIG. 17 is a side view of a head lamp for a bicycle attached on a handle by means of a conventional attaching apparatus, and FIG. 18 is a front view of the head lamp shown in FIG. 17.

Referring to the figure, a rotatable attachment part 45 consisting of an upper member 47 and a lower member 48 is attached by means of an attachment screw 33 around a pin 12 on a handle 27 with a rubber interposed. On an upper portion of the upper member 47, an attachment part 46 attached to the lower part of the head lamp 29 is slidably engaged.

FIG. 19 is an exploded perspective view showing attachment parts 45 and 46 shown in FIGS. 17 and 18 disengaged from each other.

Referring to the figure, on an upper part of attachment part 45, a pair of rail members 7a and 7b are formed. Concave portions 9a and 9b are provided on the respective rail members. Between rail members 7a and 7b, a tapped hole 13 is provided. The attachment part 45 consists of an upper member 47 and a lower member 48, which members are rotatable around pin 12. Thus, attachment part 45 can be attached to a pipe-shaped component of a bicycle, such as a handle.

Meanwhile, on a lower portion of attachment part 46, grooves 17a and 17b having the shape allowing sliding of rail members 7a and 7b of attachment part 45 are formed. Between grooves 17a and 17b, an attachment hole 23 is provided for attaching the attachment part 46 to the head lamp 49 by means of a screw, for example. On an upper surface of attachment part 46, a stopper 49 is provided for controlling engagement between attachment parts 45 and 46. Stopper 19 incorporates a spring 21, as shown in the figure.

FIG. 20 is a perspective view showing the structure of stopper 19 shown in FIG. 19. Stopper 19 has a T-shape when viewed two-dimensionally, as shown in FIG. 19. At a lower portion below the center of the T-shape, a lever 20 is provided, and at opposing end directions of the T-shape, convex portions 37a and 37b, which have triangular shape when viewed two-dimensionally, are formed. At a portion corresponding to an upper part of the T-shape, a pin-shaped projection 22 is provided, for preventing fall out of the spring 21.

FIGS. 21a to 21c show the state of engagement between rail members 7a, 7b of attachment part 45 and grooves 17a and 17b of attachment part 46, when attachment parts 45 and 46 are engaged with each other.

Referring to FIG. 21a, rail members 7a and 7b are about to be engaged with grooves 17a and 17b of attachment part 46, and leading edge portions of rail members 7a and 7b have not yet reached the convex portions 37a and 37b of stopper 19. Convex portions 37a and 37b are positioned partially protruding in a direction transverse to grooves 17a and 17b, by the spring force.

FIG. 21b shows a state in which rail members 7a and 7b further move and leading edges thereof have reached convex portions 37a and 37b. Tip ends of convex portions 37a and 37b are formed inclined as shown in the figure. Therefore, by the force applied in the direction shown by the arrow, that is, upward in the figure, the convex portions 37a and 37b gradually move against the force of the spring 21, as the rail members 7a and 7b move.

FIG. 21c shows a state in which leading edges of rail members 7a and 7b have fully pushed up convex portions 37a and 37b in the figure, then rail members 7a and 7b passed through the portions of the convexes and the rail members 7a and 7b are fully engaged with the convex portions 37a and 37b. The convex portions 37a and 37b which have been pushed upward in the state of FIG. 21b move downward in FIG. 21c by the force of spring 21, so that the convex portions 37a and 37b are fully fitted in concave portions 9a and 9b, which have shapes corresponding to the shapes of the convex portions 37a and 37b, provided in the rail members 7a and 7b. In such a state in which attachment parts 45 and 46 are attached by the fitting of rail members 7a and 7b with the groove members 17a and 17b, convex portions 37a and 37b would never be disengaged from concave portions 9a and 9b, even when force is applied in a direction for detaching attachment part 45, that is, in a direction of "B" to the rail members 7a and 7b.

When the attachment parts are to be detached from the state of FIG. 21c, convex portions 37a and 37b are moved upward in the figure by the operation of lever 20 at stopper 19, so that fitting of convex portions 37a and 37b in concave portions 9a and 9b is released, whereby sliding between attachment parts 45 and 46 is allowed.

In the conventional attachment part for bicycle parts, attachment parts 45 and 46 are firmly fixed, and therefore the position of the two-wheeled vehicle part to be attached cannot be adjusted. Therefore, referring to FIG. 22, when a light 29 for a bicycle is attached at a position within the range 30 of bicycle handle 27, the direction B to which light is emitted does not correspond to the direction "A" of travel of the bicycle, and hence the light does not illuminate the direction of travel of the bicycle.

SUMMARY OF THE INVENTION

An object of the present invention is to provide an apparatus for attaching a two-wheeled vehicle part so as to allow for adjustment of attachment angle of the two-wheeled vehicle part.

Another object of the present invention is to provide an attachment apparatus for allowing easy attachment of a two-wheeled vehicle part.

The above described objects of the present invention can be attained by the apparatus for attaching a two-wheeled vehicle part including a first attachment part attached to a component of a two-wheeled vehicle, a second attachment part fixed on a two-wheeled vehicle part, and a third attachment part detachably engaging the first and second attachment parts, and allowing, in the engaged state, relative rotation of the first and second attachment parts about an axis passing through the first and second attachment parts.

The apparatus for attaching a two-wheeled vehicle part structured as described above allows adjustment of the attachment angle between the component of the two-wheeled vehicle and the two-wheeled vehicle part.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
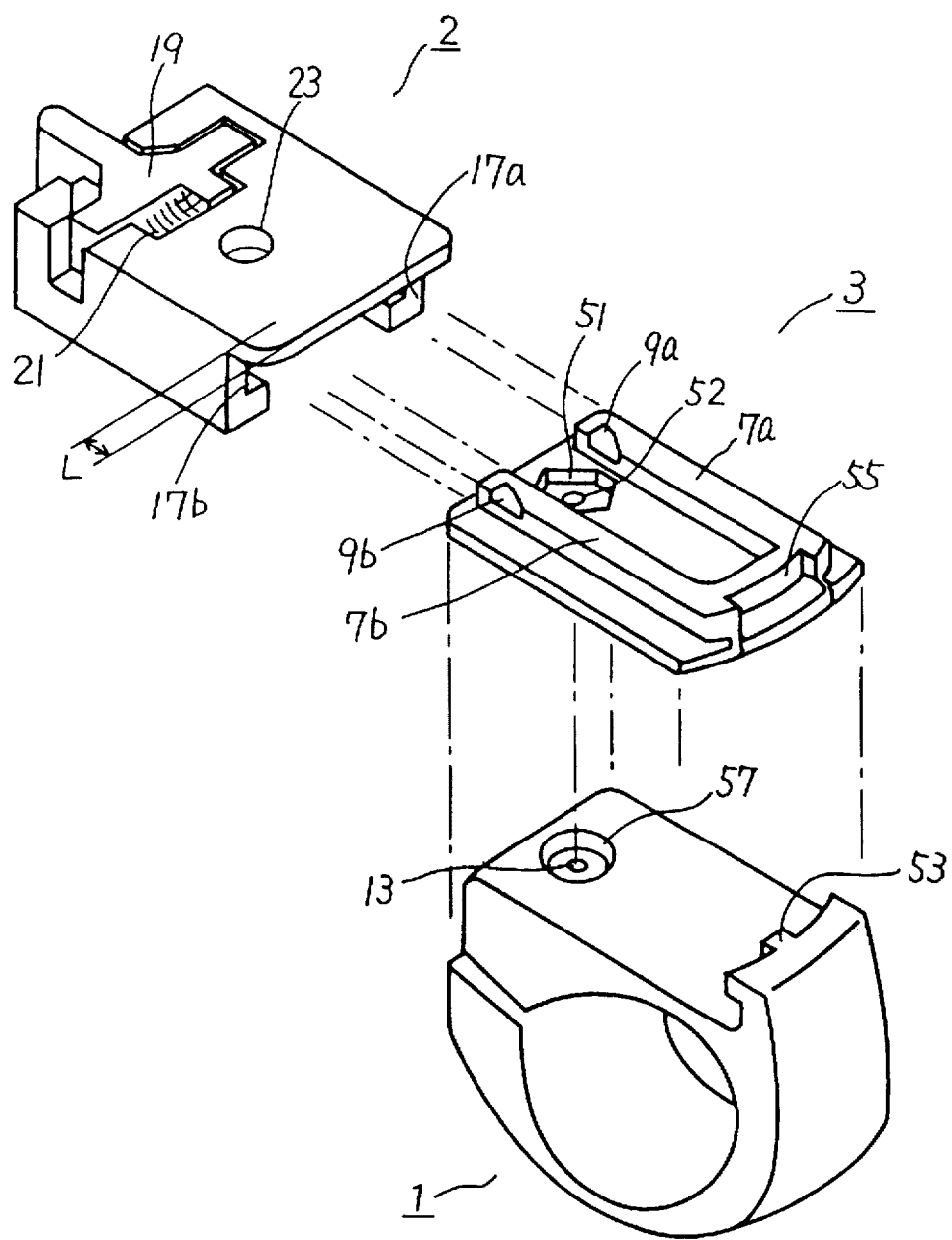
FIG. 1 is an exploded perspective view showing attachment parts 1 to 3 disengaged, of an attachment apparatus in accordance with one embodiment of the present invention.

An embodiment of the present invention will be described with reference to the drawings. In the drawings, like reference characters denote like parts.

Figure 2:
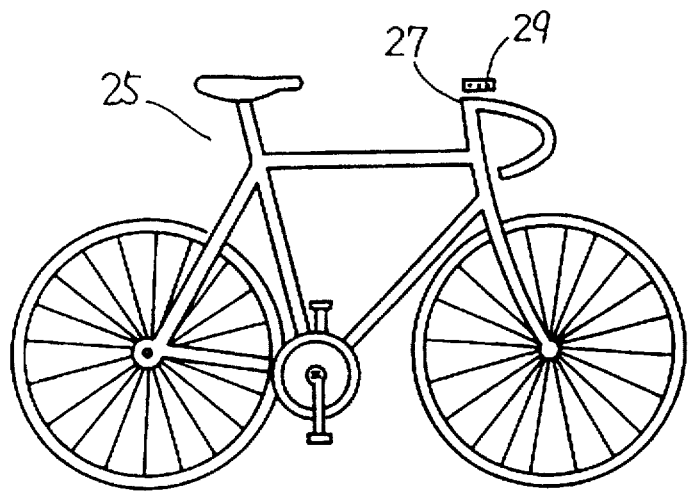
FIG. 2 is a side view showing a head lamp 29 attached on an handle 27 of a bicycle 25 by means of the attachment apparatus in accordance with one embodiment of the present invention.

FIG. 2 is a side view showing a head lamp 29 attached on a handle 27 of a bicycle 25 by means of an attachment apparatus in accordance with one embodiment of the present invention.

Figure 3:
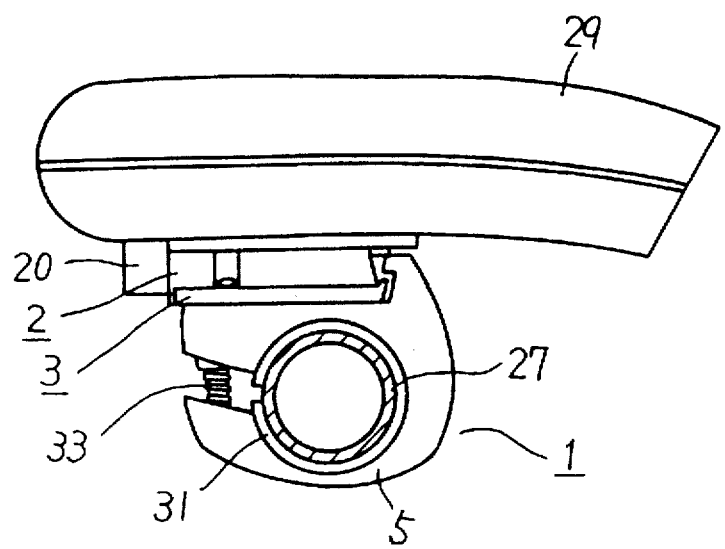
FIG. 3 is a side view showing a state in which head lamp 29 is attached on handle 27 of FIG. 2.
Figure 4:
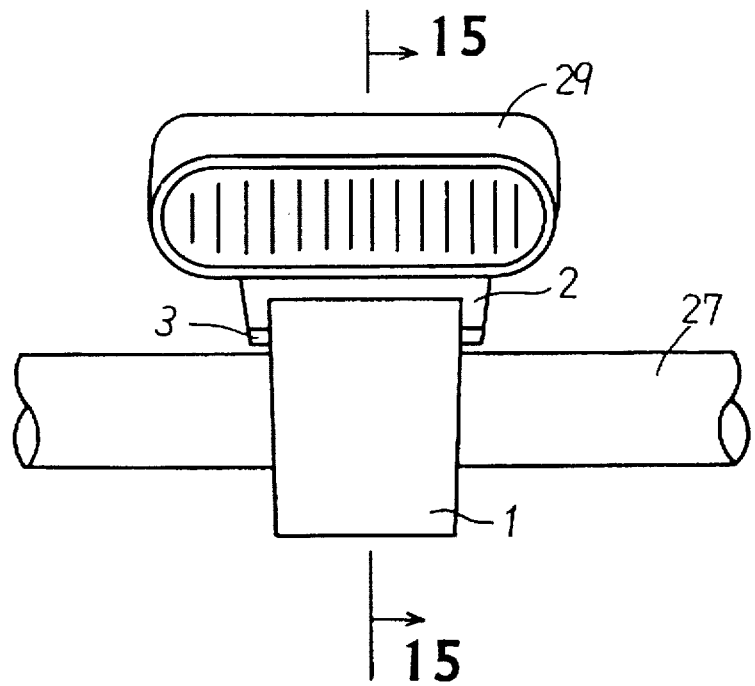
FIG. 4 is a front view corresponding to FIG. 3.

FIG. 3 shows a specific structure of the head lamp 29 attached on handle 27 of FIG. 2. FIG. 4 is a front view thereof, and FIG. 5 is a rear view thereof.

Referring to FIG. 2 to 5, an attachment part 1 is formed of a flexible plastic resin. When attachment part 1 is to be attached on handle 27 of a bicycle, an end portion of attachment part 1 is widened with attaching screw 33 removed, and attachment part 1 is attached gripping a rubber 31 with the rubber wound around handle 27 of the bicycle. Thereafter, attaching screw 33 is fastened, so that attachment part 1, as well as attachment part 3, are firmly attached on handle 27. A switch button 35 controlling on/off of the lamp is provided at a rear portion of head lamp 29. Attachment part 2 is attached by means of a screw, for example, to the lower portion of head lamp 29. A lever 20 used for attachment/detachment to and from attachment part 3 is provided at a rear portion of attachment part 2.

Figure 5:
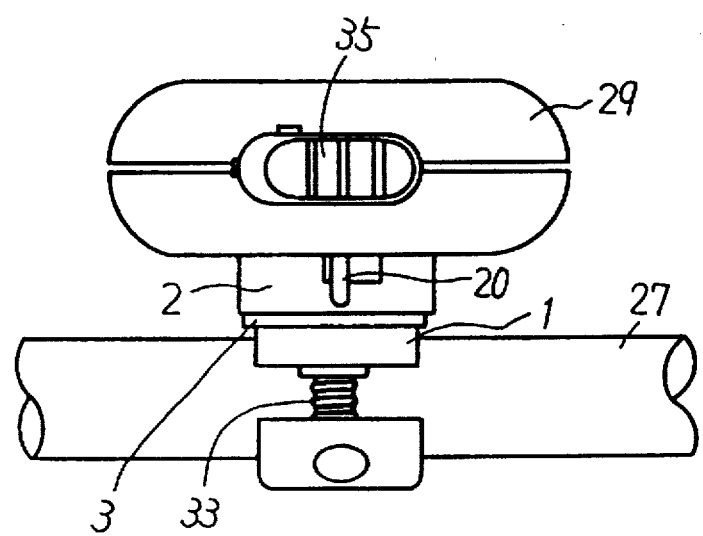
FIG. 5 is a rear view corresponding to FIG. 3.
Figure 6:
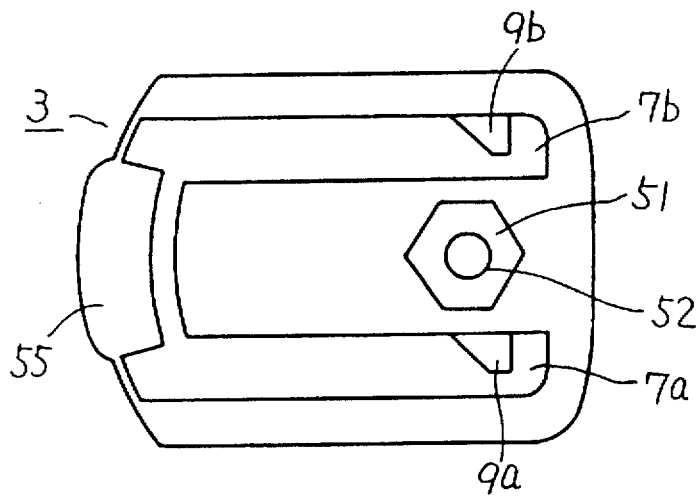
FIG. 6 is a plan view of attachment part 3.
Figure 7:
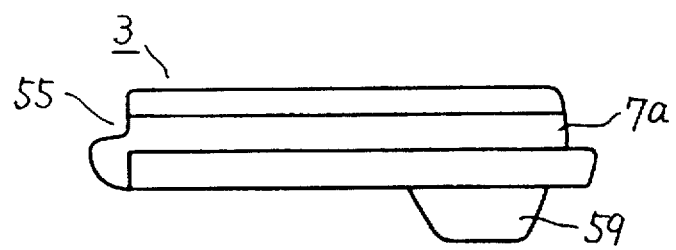
FIG. 7 is a side view of attachment part 3.
Figure 8:
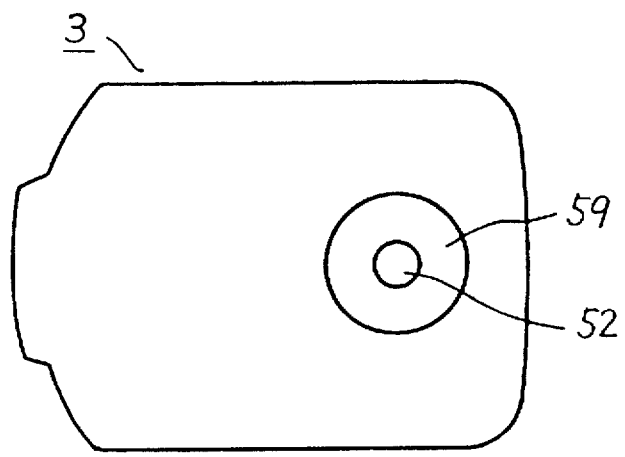
FIG. 8 is a bottom view of attachment part 3.
Figure 15:
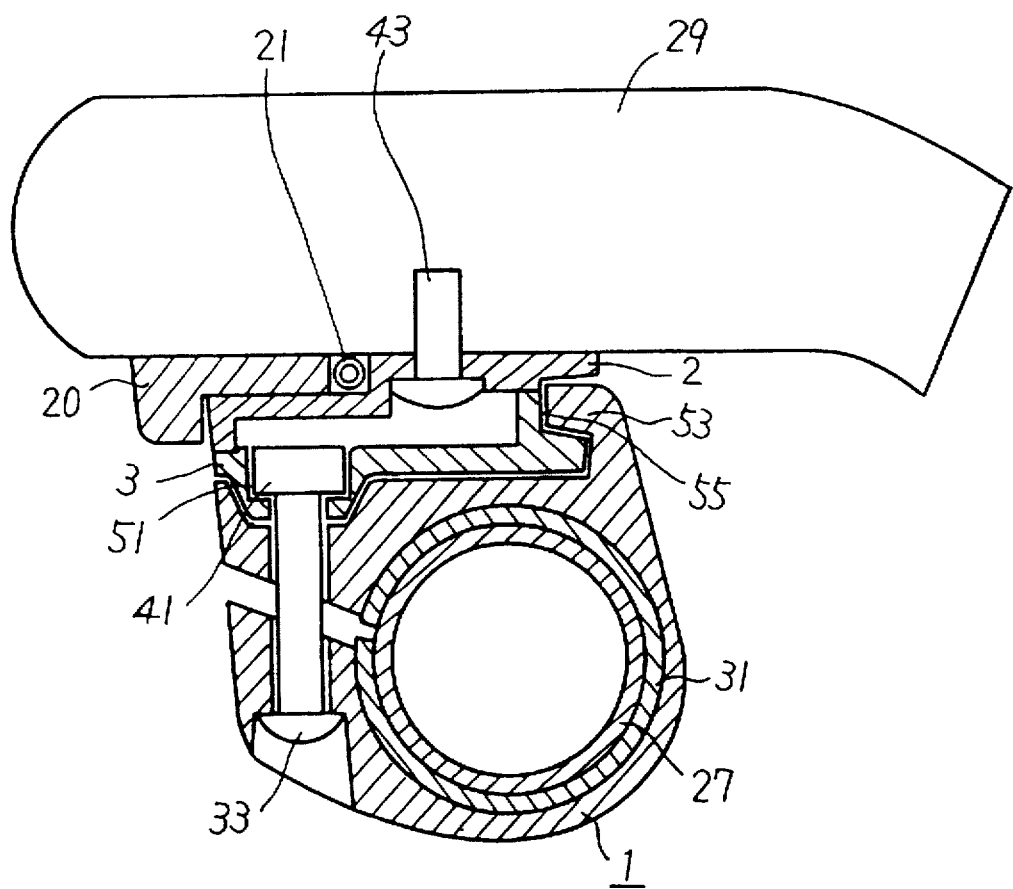
FIG. 15 is a cross section taken along the line 15—15 FIG. 4.

FIG. 1 is an exploded perspective view showing attachment parts 1 to 3 shown in FIGS. 3 to 5, which are disengaged from each other. FIG. 6 is a plan view of attachment part 3, FIG. 7 is a side view of attachment part 3, and FIG. 8 is a bottom view of attachment part 3. FIG. 15 is a cross section taken along the line XII—XII of FIG. 4.

As seen in FIG. 1, a pair of rail members 7a and 7b are formed at an upper portion of attachment part 3. Concave portions 9a and 9b are formed in respective rail members. Between rail members 7a and 7b, a nut fixing concave portion 51 for fixing a nut is provided, and a threaded hole 52 is provided in the nut fixing concave portion 51. On an upper portion of attachment part 3, a concave portion 55 is provided, which is engaged with a projecting portion 53 of attachment part 1 for setting a range of rotation of attachment part 3 about threaded hole 52 serving as an axis.

On a rear surface of attachment part 3, a convex portion 59 having a shape of a frustum of circular cone, which is fitting in a dish shaped concave portion 57 of attachment part 1, is formed around the threaded hole 52.

On an upper part of attachment part 1, there are formed a concave portion 57 fitting with convex portion 59 of attachment part 3, a tapped hole 13 corresponding to threaded hole 52 of attachment part 3, and a projection portion 53 engaging with the concave portion 55 of attachment part 3.

Figure 10:
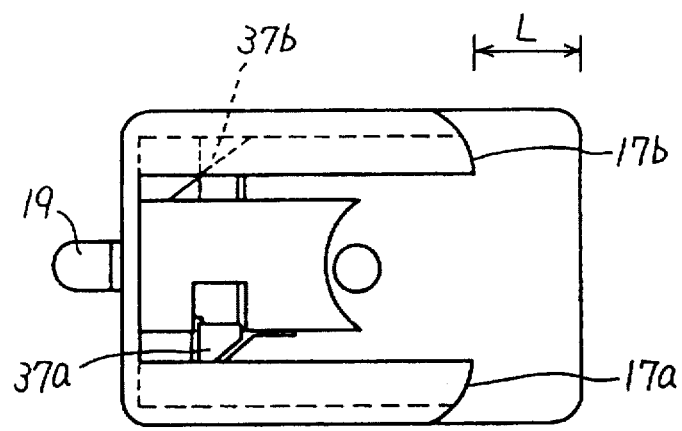
FIG. 10 is a bottom view of attachment part 2.

Similar to the prior art example, on an upper surface of attachment part 2, a stopper 19 and a spring 21 for controlling engagement between attachment parts 2 and 3 are provided, at a lower portion, grooves 17a and 17b engaging with rail members 7a and 7b, respectively, are provided, and between grooves 17a and 17b, an attachment hole 23 is provided. However, end portions of grooves 17a and 17b on the side receiving rail portions 7a and 7b are formed spaced by a distance L from the end portion of attachment part 2 (as seen in FIG. 10). This is to prevent contact between attachment part 1 and grooves 17a and 17b, when attachment parts 1 to 3 are engaged.

As shown in FIG. 15, attachment parts 1 and 3 are brought into pressure contact by means of attachment screw 33 introduced to respective threaded holes and a nut 41 fitted in nut fixing concave portion 51 of attachment part 2. Attachment part 2 and head lamp 29 are fixed by a head lamp attaching screw 43.

Figure 16A:
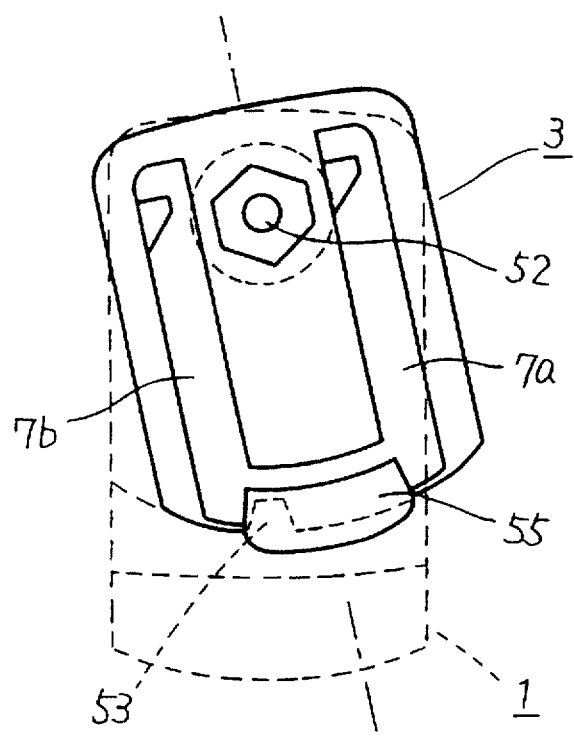
FIGS. 16a and 16b are illustrations showing engagement between attachment parts 1 and 3.
Figure 16B:
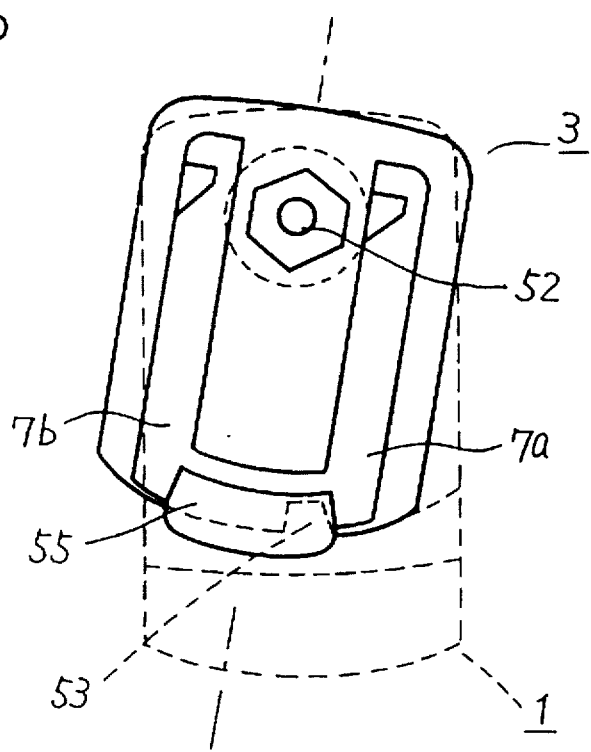
Figure 17:
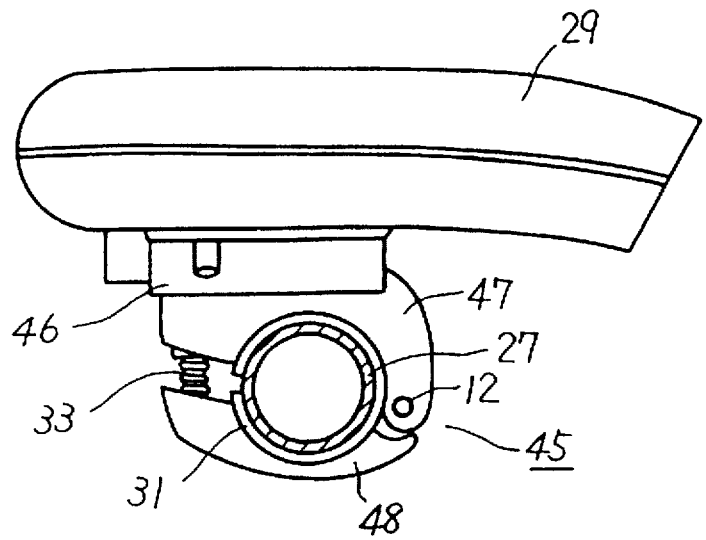
FIG. 17 is a side view showing a head lamp for a bicycle attached to a handle by means of a conventional attachment apparatus.
Figure 18:
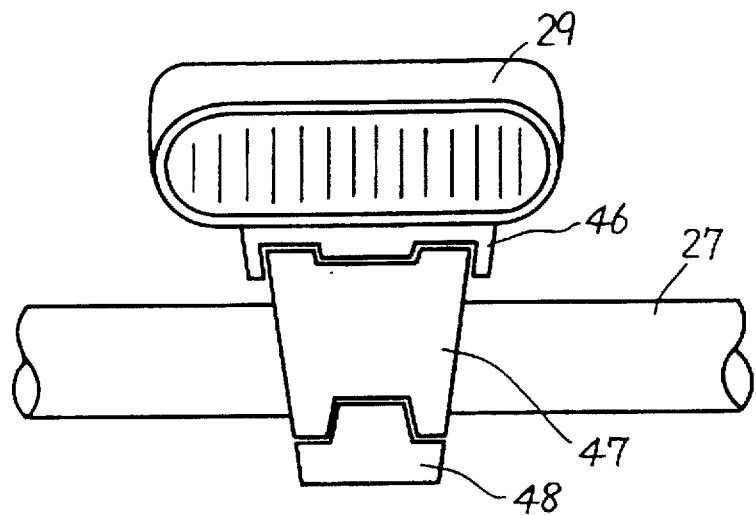
FIG. 18 is a front view of the head lamp shown in FIG. 17.
Figure 19:
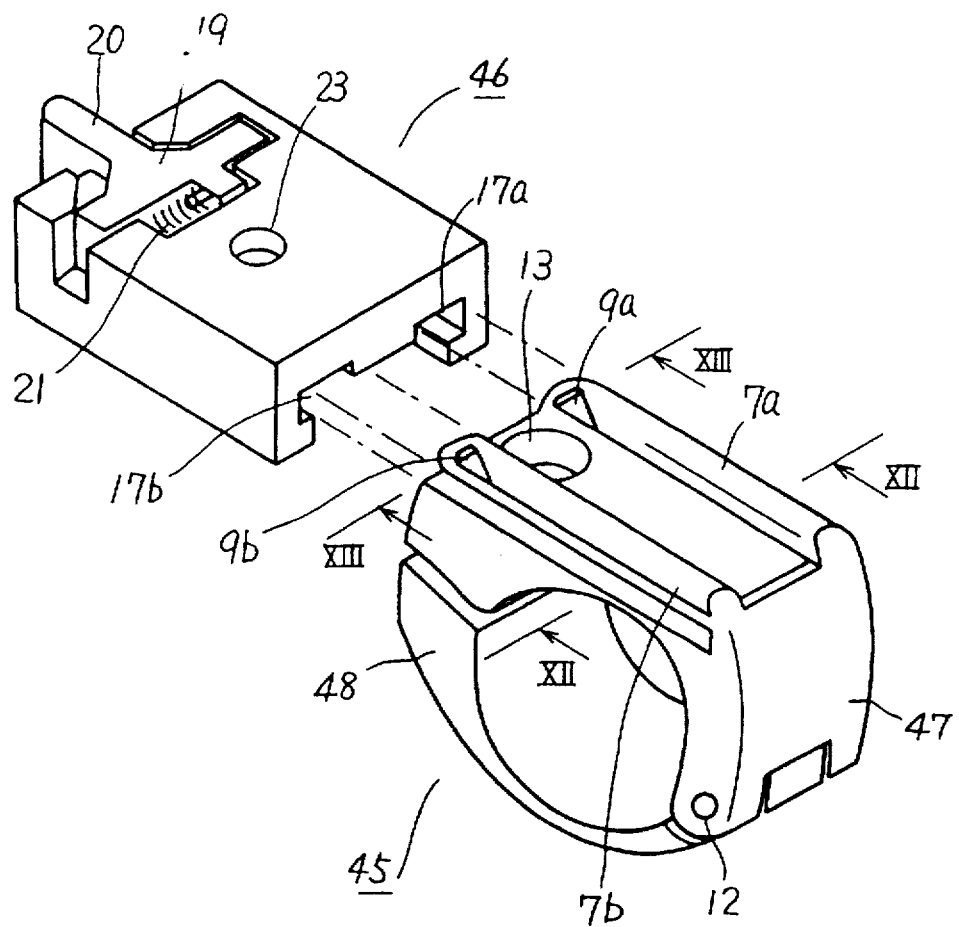
FIG. 19 is an exploded perspective view showing attachment parts 45 and 46 shown in FIGS. 17 and 18 disengaged from each other.
Figure 20:
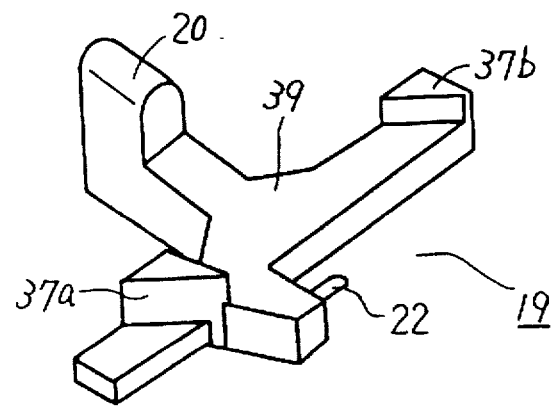
FIG. 20 is a perspective view showing a structure of stopper 19 shown in FIG. 19.
Figure 21A:
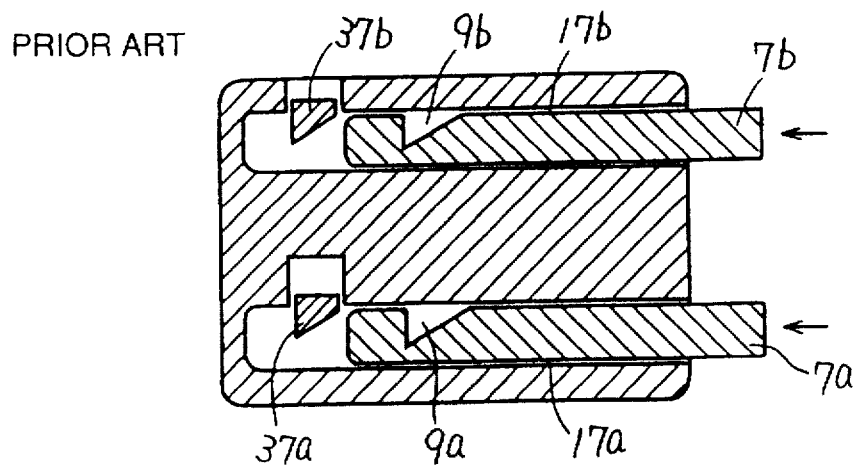
FIGS. 21a to 21c show state of engagement between rail members on attachment part 45 and grooves on attachment part 46, when attachment parts 45 and 46 engaged.
Figure 21B:
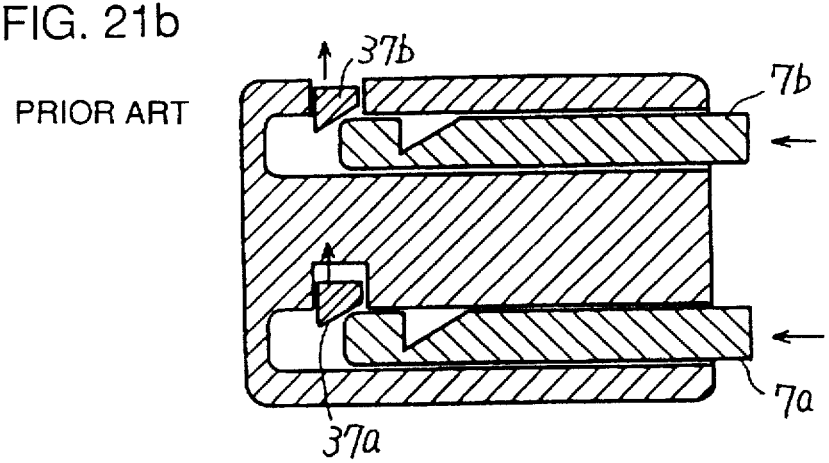
Figure 21C:
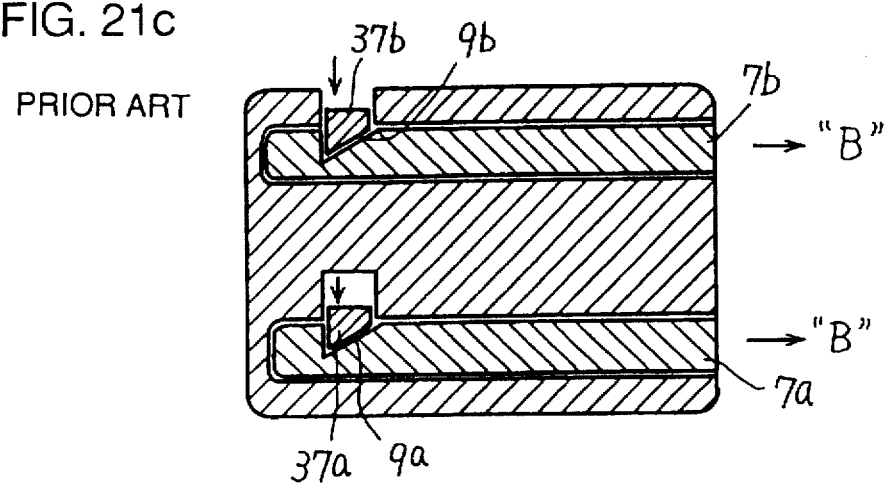
Figure 22:
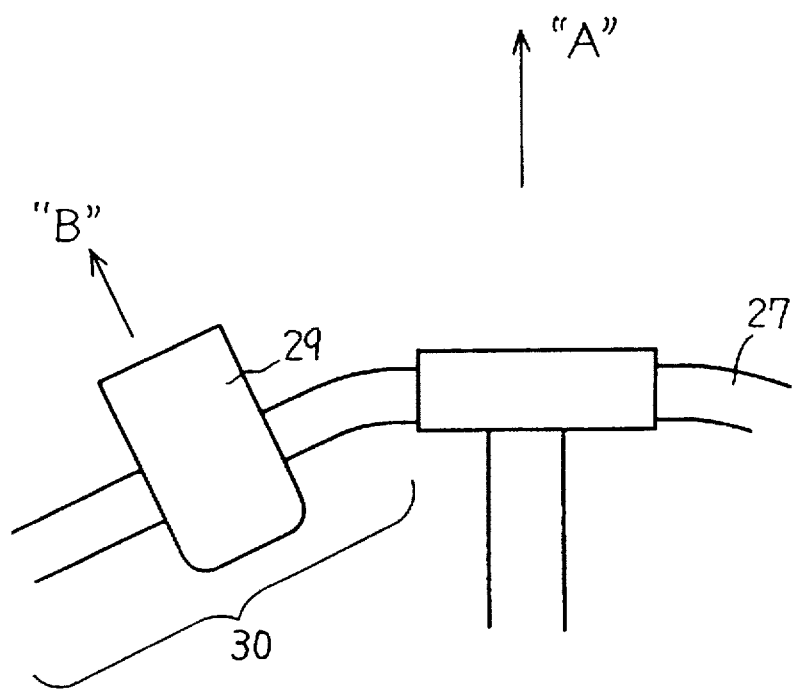
FIG. 22 is an illustration showing a problem of the conventional attachment apparatus.

FIG. 16a and 16b shows the relationship of engagement of attachment parts 1 and 3.

When the attachment screw 33 is released and pressure contact implemented by attachment screw and the nut between attachment part 1 denoted by the dotted line and attachment part 3 denoted by a solid line is released, the attachment parts 1 and 3 can rotate relatively with the threaded hole 52 serving as an axis. Rotation is allowed in a range in which a projecting portion 53 formed at attachment part 1 engages with the concave portion 55 formed at attachment part 3.

FIG. 16a shows a limit position when attachment part 3 is rotated counterclockwise with respect to attachment part 1. In this state, projecting portion 53 of attachment part 1 abuts the edge of rail member 7a of attachment part 3, and hence attachment part 3 cannot further rotate in counter-clockwise direction.

FIG. 16b shows the limit position of clockwise rotation of attachment part 3 with respect to attachment part 1, corresponding to FIG. 16a. In this state, projecting portion 53 of attachment part 1 abuts the edge portion of rail member 7a of attachment part 3.

Attachment parts 1 and 3 are engaged when attachment screw is fastened and attachment parts 1 and 3 are brought into pressure contact with each other.

More specifically, at the time of attachment, attachment part 3 can be fixed in a desired direction, by first directing attachment part 3 in a desired direction and thereafter fastening the attachment screw.

Figure 9:
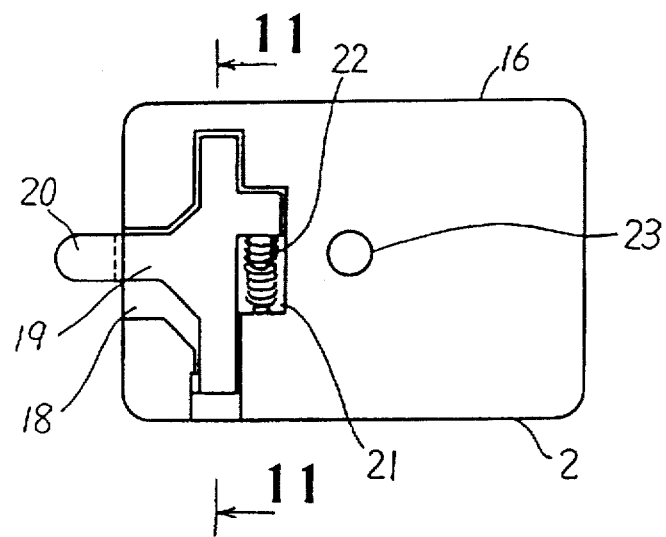
FIG. 9 is a plan view of attachment part 2.
Figure 11:
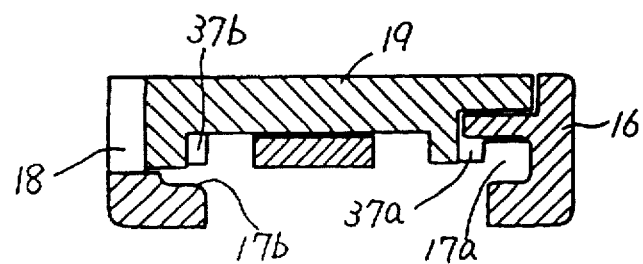
FIG. 11 is a cross section taken along the line II—II of FIG. 9.

FIG. 9 is a plan view of attachment part 2 shown in FIG. 1, FIG. 10 is a bottom view thereof and FIG. 11 is a cross section taken along the line 11—11 of FIG. 9.

Referring to the figures, attachment part 2 differs from the prior art example in that end portions of grooves 17a and 17b on the side receiving rail members 7a and 7b are formed spaced by a distance L from the end portion of attachment part 2.

Figure 12:
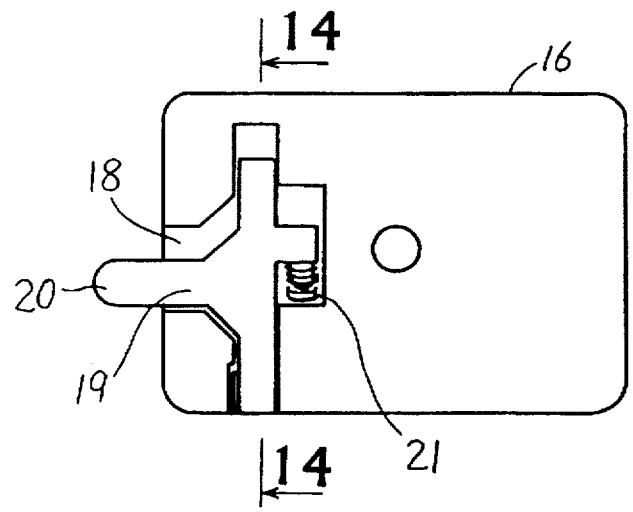
FIG. 12 is a plan view of attachment part 2 when stopper 19 is moved against the force of spring 21.
Figure 13:
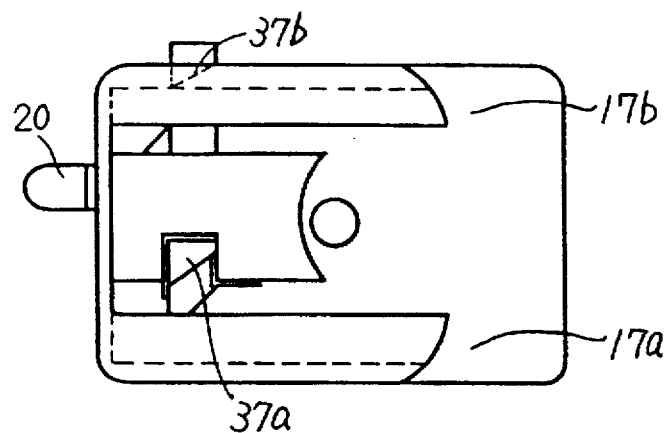
FIG. 13 is a bottom view corresponding to FIG. 12.
Figure 14:
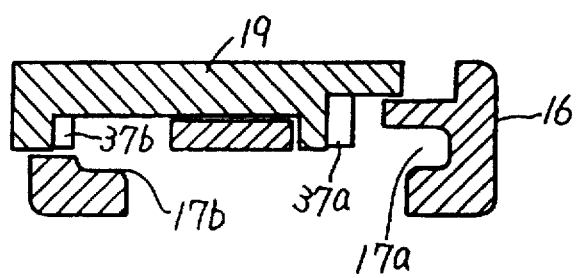
FIG. 14 is a cross section taken along the line 14—14 of FIG. 12.

As in the prior art, because of the spring force, stopper 19 is urged upward in FIG. 9. At this time, convex portions 37a and 37b of stopper 19 are positioned in a direction transverse to grooves 17a and 17b, respectively, as shown in FIGS. 10 and 11. FIGS. 12 to 14 correspond to FIGS. 9 to 11, showing a state in which stopper 19 is moved downward by means of lever 20 in FIG. 9, against the force of the spring 21.

In this state also, as in the prior art, convex portions 37a and 37b move together with stopper 19, and hence convex portions 37a and 37 do not prevent movement of rail members 7a and 7b sliding in grooves 17a and 17b.

By the movement of convex portions 37a and 37b of stopper 19 as described above, the engaged state of attachment parts 2 and 3 can be similarly controlled as in the prior art.

Though grooves 17a and 17b are provided in attachment part 2 and rails 7a and 7b are provided on attachment part 3 in the above described embodiment, rails 7a and 7b may be provided on attachment part 2 and grooves 17a and 17b may be provided in attachment part 3.

Though attachment parts 1 and 3 are rotatable relative to each other and attachment parts 2 and 3 are attachable/detachable in the above described embodiment, attachment parts 1 and 3 may be attachable/detachable and attachment parts 2 and 3 may be rotatable. In that case, more specifically, rail members and grooves are formed at attachment parts 1 and 3, a convex portion having a shape of a frustum of circular cone and dish shaped concave portion may be formed at attachment parts 2 and 3 which are engaged by means of a screw.

Though a head lamp has been described as a bicycle part, the present invention can similarly be applied to other bicycle parts.

Further, though the above described embodiment is applied to attach a bicycle component, the present invention can be applied to attach various parts not only on bicycles but also on two-wheeled vehicles and on other objects.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for attaching a two-wheeled vehicle part, comprising:

a first attachment part attached to a component of a two-wheeled vehicle;

a second attachment part fixed on a part for a two-wheeled vehicle;

a third attachment part detachably engaging said first and second attachment parts and when engaged, allowing relative rotation of said first and second attachment parts around an axis passing through said first and second attachment parts, and inhibiting means for inhibiting rotation of said first and second attachment parts, said inhibiting means being accessible even when the first attachment part and the second attachment part are engaged.

2. The apparatus for attaching a two-wheeled vehicle part according to claim 1, wherein said inhibiting means inhibits rotation by fixing said first and third attachment parts or said second and third attachment parts.

3. The apparatus for attaching a two-wheeled vehicle part according to claim 1, wherein said inhibiting means includes a screw and a nut engaged with said screw.

4. The apparatus for attaching a two-wheeled vehicle part according to claim 1, further comprising:

rotation limiting means for limiting the rotation of said first and second attachment parts.

5. The apparatus for attaching a two-wheeled vehicle part according to claim 4, wherein said rotation limiting means includes a groove having opposing ends, and a projection movable in said groove between the opposing ends.

6. The apparatus for attaching a two-wheeled vehicle part according to claim 1, further comprising:

a first fitting portion formed on one of said second and third attachment parts, having a rail member having at least one end opened, a part of said rail member being provided with a concave portion;

a second fitting position formed on the other one of said second and third attachment parts, including a groove slidably fitting with said rail and having at least one end opened, and a stopper having at its tip end a convex portion engaging with the concave potion of said rail in said groove and movable in a direction transverse to said groove; and a third fitting portion adapted to be positioned between the first and second fitting portions;

wherein when said third fitting portion is attached to said second attachment part by fitting between said first and second fitting portions, said stopper moves while said rail is fitted in said groove so that said convex portion and said concave portion are engaged with each other, thus preventing disengagement of said first and second fitting portions.

7. The apparatus for attaching a two-wheeled vehicle part according to claim 6, wherein said component of the two-wheeled vehicle includes a handlebar of a bicycle.

8. The apparatus for attaching a two-wheeled vehicle part according to claim 7, wherein said two-wheeled vehicle part includes a head lamp for a bicycle.

* * * * *